US012792215B2

(12) United States Patent
Lee et al.

(10) Patent No.: US 12,792,215 B2
(45) Date of Patent: Nov. 10, 2026

(54) ELECTRONIC CONTROL UNIT, STORAGE DEVICE, AND SYSTEM INCLUDING THE SAME

(71) Applicant: Samsung Electronics Co., Ltd., Suwon-si (KR)

(72) Inventors: Jongin Lee, Suwon-si (KR); Sanghwa Jin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 19/240,870

(22) Filed: Jun. 17, 2025

(65) Prior Publication Data

US 2026/0169626 A1 Jun. 18, 2026

(30) Foreign Application Priority Data

Dec. 16, 2024 (KR) ........................ 10-2024-0187574

(51) Int. Cl.

| | |
|---|---|
| ***G06F 3/06*** | (2006.01) |
| ***B60R 16/023*** | (2006.01) |
| ***B60W 50/02*** | (2012.01) |
| ***G06F 11/07*** | (2006.01) |

(52) U.S. Cl.

CPC ............ *G06F 3/061* (2013.01); *B60R 16/023* (2013.01); *B60W 50/02* (2013.01); *G06F 3/0659* (2013.01); *G06F 3/0679* (2013.01); *G06F 11/0757* (2013.01)

(58) Field of Classification Search

CPC ...... G06F 3/061; G06F 3/0659; G06F 3/0679; G06F 11/0757; B60R 16/023; B60W 50/02

See application file for complete search history.

(56) References Cited

U.S. PATENT DOCUMENTS

| | | | | |
|---|---|---|---|---|
| 6,381,532 | B1 * | 4/2002 | Bastian | G06F 13/4059 710/10 |
| 6,427,180 | B1 * | 7/2002 | Bastian | G06F 13/126 710/5 |
| 11,115,425 | B2 | 9/2021 | Ando et al. | |
| 11,474,889 | B2 | 10/2022 | Nagara et al. | |

(Continued)

FOREIGN PATENT DOCUMENTS

JP 2023-107137 A 8/2023

*Primary Examiner* — Michael Alsip

(74) *Attorney, Agent, or Firm* — Harness, Dickey & Pierce, P.L.C.

(57) ABSTRACT

A system includes a storage device including a queue manager, controller, and memory device; and a plurality of electronic control units (ECUs), each ECU of the plurality of ECUs connected to the storage device through a first input/output port and second input/output port, a first ECU of the plurality of ECUs configured to send a first command through the first input/output port of the first ECU, the storage device configured to send a timeout state of the first command to the first ECU through the second input/output port of the first ECU in response to sensing a timeout while receiving first data in response to the first command, and the first ECU configured to send remaining first data, not sent, selectively through a second ECU of the plurality of ECUs or through the second input/output port of the first ECU to the queue manager in response to the timeout state.

20 Claims, 13 Drawing Sheets

(56) References Cited

U.S. PATENT DOCUMENTS

| | | | | |
|---|---|---|---|---|
| 11,909,755 | B2 | 2/2024 | Nagara et al. | |
| 11,971,982 | B2 | 4/2024 | Nagara et al. | |
| 12,106,610 | B2 | 10/2024 | Hirano et al. | |
| 2011/0245935 | A1* | 10/2011 | Katou | G05B 9/03 700/21 |
| 2019/0147923 | A1 | 5/2019 | Pawlowski | |
| 2022/0239406 | A1* | 7/2022 | Nakamura | H04L 12/46 |
| 2023/0211794 | A1* | 7/2023 | Ushiro | B60W 50/0205 701/32.7 |
| 2023/0319084 | A1 | 10/2023 | Sekiya et al. | |
| 2023/0367664 | A1* | 11/2023 | Li | B60R 16/023 |
| 2024/0430130 | A1* | 12/2024 | Handiganoor | G06F 11/0796 |
| 2025/0225013 | A1* | 7/2025 | Choi | G06F 11/0757 |

* cited by examiner

ELECTRONIC CONTROL UNIT, STORAGE DEVICE, AND SYSTEM INCLUDING THE SAME

CROSS-REFERENCE TO RELATED APPLICATION

This application claims benefit of priority to Korean Patent Application No. 10-2024-0187574 filed on Dec. 16, 2024 in the Korean Intellectual Property Office, the disclosure of which is incorporated herein by reference in its entirety.

BACKGROUND

Some example embodiments of the present inventive concepts relate to an electronic control unit, a storage device, and/or a system including the same.

Recently, in the automobile industry, various devices and/or systems have been developed to provide driving convenience to users. For example, a system may include various electronic control units (ECUs) performing complex data processing and real-time information processing and a storage device has been provided. The system may control driving, safety, engine management, and/or the like, of a vehicle, and may effectively manage and store a large amount of data. Since there is a risk of damage to the system due to a physical impact caused by a vehicle accident, it may be advantageous to provide an optimized system that may stably and efficiently store data and/or important data provided from the electronic control unit in a storage device despite damages caused by, for example, a vehicle accident.

SUMMARY

Some example embodiments of the present inventive concepts provide an electronic control unit which may, when a timeout is sensed while receiving first data from a first electronic control unit in response to a first command from a storage device, receive remaining first data through another electronic control unit or another input/output port, may stably store first data in a memory device, and may relieve an occupancy state of a queue, a storage device, and/or a system including the same.

According to some example embodiments, a system includes a storage device including a queue manager, a controller, and a memory device; and a plurality of electronic control units, each electronic control unit of the plurality of electronic control units configured to connect to the storage device with a first input/output port and a second input/output port, the second input/output port having a first type different than a second type of the first input/output port, the plurality of electronic control units including a first electronic control unit, the first electronic control unit configured to send a first command to the queue manager through the first input/output port of the first electronic control unit, the storage device configured to send a timeout state of the first command to the first electronic control unit through the second input/output port of the first electronic control unit in response to the storage device sensing a timeout while receiving first data from the first electronic control unit in response to the first command, and the first electronic control unit is configured to send remaining first data, not sent, selectively through a second electronic control unit of the plurality of electronic control units or through the second input/output port of the first electronic control unit to the queue manager in response to the timeout state.

According to some example embodiments, an electronic control unit includes a central processing unit; a baseboard management controller; a first input/output port configured to send a command and data corresponding to the command to a storage device; and a second input/output port connected to the baseboard management controller, the second input/output port configured to receive a state of the storage device, the central processing unit configured to send a first command and first data to the storage device through the first input/output port, receive a timeout state of the first command from the storage device through the second input/output port, and send remaining first data, not sent, among the first data to the storage device through the second input/output port or through another electronic control unit in response to the timeout state.

According to some example embodiments, a storage device includes a memory device configured to store data; a queue manager including a first queue and a second queue, the first queue configured to receive a first command from a first electronic control unit, and the second queue configured to receive a second command from a second electronic control unit; and a controller configured to control the memory device in response to the first command received from the first queue and the second command received from the second queue, the queue manager configured to, in response to sensing a timeout while receiving first data in response to the first command stored in the first queue, send a timeout state for the first command and a first state of the second queue to the first electronic control unit, and receive the remaining first data, not received, among the first data in response to the second command received from the second electronic control unit.

According to some example embodiments, a method of operating a storage device including a memory device, a queue manager, and a controller is provided, the method comprising receiving a first command from a first electronic control unit by a first queue of the queue manager and a second command from a second electronic control unit by a second queue of the queue manager; controlling, by the controller, the memory device in response to the first command received from the first queue and the second command received from the second queue; and in response to sensing a timeout while receiving first data in response to the first command stored in the first queue, sending a timeout state for the first command and a first state of the second queue to the first electronic control unit and receiving remaining first data, not received, among the first data in response to the second command received from the second electronic control unit.

In some example embodiments, the second command includes source information indicating that the remaining first data is sent from the first electronic control unit, and the method includes processing the remaining first data received from the second electronic control unit as second data received from the first electronic control unit based on the source information.

In some example embodiments, the method includes transferring a second state of the first queue to the first electronic control unit, transferring the first state of the second queue to the second electronic control unit, determining a first priority of the first command and a second priority of the second command, and transferring the first command and the second command to the controller according to the first priority and the second priority.

In some example embodiments, the method includes determining a first priority of the first command and a second priority of the second command based on whether the first data and second data corresponding to the second command is safety data, sensor data, or camera data.

BRIEF DESCRIPTION OF DRAWINGS

The above and other aspects, features, and/or advantages of some example embodiments of the present inventive concepts will be more clearly understood from the following detailed description, taken in combination with the accompanying drawings, in which.

DETAILED DESCRIPTION

Figure 1:
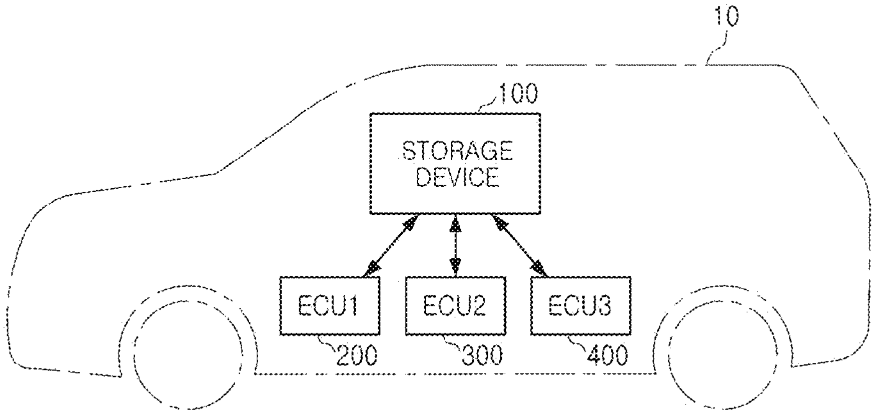
FIG. 1 is a block diagram illustrating a system according to some example embodiments.

Hereinafter, some example embodiments of the present inventive concepts will be described as follows with reference to the accompanying drawings.

It will be understood that, as used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element component, step or operation from another element, component, step, or operation.

Further, it will be understood that like reference numerals designate like elements throughout the specification. The sequence of operations or steps are not limited to the order presented in the claims and/or figures unless specifically indicated otherwise. The order of operations and/or steps may be changed, several operations and/or steps may be merged, a certain operation and/or step may be divided, and a specific operation and/or step may not be performed.

FIG. 1 is a block diagram illustrating a system according to some example embodiments.

Referring to FIG. 1, a vehicle system 10 may include a storage device 100 and a plurality of electronic control units (ECUs) such as a first electronic control unit 200, a second electronic control unit 300, and a third electronic control unit 400. In some example embodiments, the vehicle system 10 may further include a sensor, an actuator, and a communication control device. While FIG. 1 illustrates the vehicle system 10 as including a first electronic control unit 200, a second electronic control unit 300, and a third electronic control unit 400, example embodiments are not limited thereto, and in some example embodiments the vehicle system 10 may have at least one electronic control unit.

The storage device 100 may store data obtained from the plurality of electronic control units 200, 300, and 400, or may provide the stored data to the plurality of electronic control units 200, 300, and 400. For example, the first electronic control unit 200 may store data collected from a sensor in the storage device 100, and the second electronic control unit 300 may receive data stored in the storage device 100.

According to some example embodiments, as functions of the vehicle are diversified, multiple electronic control units responsible for respective functions of the vehicle may be installed in a vehicle. The electronic control unit may control operations of the control target device of the vehicle, such as a sensor and an actuator. The plurality of electronic control units 200, 300, and 400 included in the vehicle system 10 may include an engine control device, a transmission control device, a telematics control unit (TCU), an infotainment system, an advanced driver assistance system (ADAS), a vehicle network gateway, and/or a vehicle safety and security-related ECU.

In some example embodiments, the engine control device may be configured as an ECU for optimizing performance of a vehicle engine and efficiency of the vehicle engine, and may control the amount of fuel injection and ignition timing, or the like. The transmission control device may control transmission of the vehicle and may process information such as a speed and the number of rotations of a transmission. The TCU may control the communication function of the vehicle. The infotainment system may control functions such as media playback, navigation, and/or hands-free calling in the vehicle. The ADAS may be an ECU for autonomous driving of the vehicle. The vehicle safety and security-related ECU may be an ECU for an airbag and seat belt of the vehicle.

At least one of the plurality of electronic control units 200, 300, and 400 may be connected to a sensor and an actuator, and the at least one electronic control unit may collect data from the sensor and the actuator. The plurality of electronic control units 200, 300, and 400 may provide the data collected from the sensor and the actuator to the storage device 100. The data provided to the storage device 100 by the plurality of electronic control units 200, 300, and 400 may include engine data, sensor data, location data, infotainment data, driver behavior data, safety data, service and maintenance record data, and/or network communication data.

As autonomous driving technology of a vehicle develops, a vehicle may have dozens or more sensors and actuators, and accordingly, the vehicle system 10 may include multiple electronic control units. The plurality of electronic control units 200, 300, and 400 may process a large amount of data, and it may be advantageous to provide a large-capacity storage device 100 in the vehicle system 10 for storing the large amount of data.

Referring to FIG. 1, the plurality of electronic control units 200, 300, and 400 may be connected to one storage device 100. In some example embodiments, a vehicle accident may occur while the storage device 100 receives first data from the first electronic control unit 200. It may be important to store data at the time of the vehicle accident.

In some example embodiments, in the event of a vehicle accident, a defect may occur in a port connecting the storage device 100 to the first electronic control unit 200 due to an external physical impact. Accordingly, a timeout state may occur in which the storage device 100 does not receive the first data in a predetermined or alternatively, a desired period of time. In some example embodiments, when the timeout state is not relieved, the first data may not be stored in the storage device 100, and also resources of the storage device 100 may be continuously occupied to process a first command, such that the storage device 100 may not be able to receive data from other electronic control units. Accordingly, the storage device 100 may lose important data including the first data.

In the system 10 according to some example embodiments, the first electronic control unit 200 may optionally provide the remaining first data, not transmitted and/or sent, through another port to the storage device 100, or may provide the remaining first data to the storage device 100 through another electronic control unit. For example, the first electronic control unit 200 may optionally provide the remaining first data that was not transmitted and/or sent to the storage device 100 through another port to the storage device 100, or may provide the remaining first data to the storage device 100 through another electronic control unit such as the second electronic control unit 300. Accordingly, the first data, which may be important data in the event of an accident, may be safely stored in the storage device 100, and the timeout state of the storage device 100 may be relieved.

Figure 2:
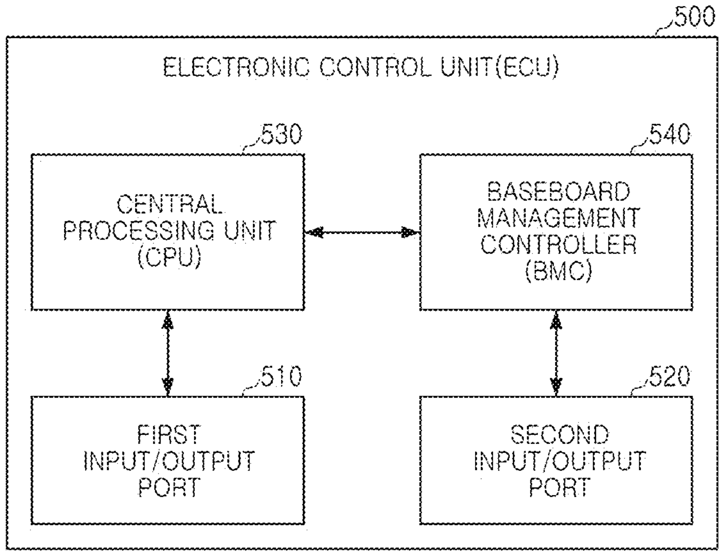
FIG. 2 is a block diagram illustrating an electronic control unit according to some example embodiments.

FIG. 2 is a block diagram illustrating an electronic control unit according to some example embodiments.

Referring to FIG. 2, an electronic control unit 500 according to some example embodiments may include a first input/output port 510, a second input/output port 520, a central processing unit (CPU) 530, and a baseboard management controller (BMC) 540.

The first input/output port 510 may provide commands generated by the central processing unit 530 and data collected from a sensor and an actuator to the storage device 100. In some example embodiments, the first input/output port 510 may receive data stored in the storage device 100. In some example embodiments, the first input/output port 510 may be implemented as a peripheral component interconnect express (PCIe) port.

The second input/output port 520 may be directly connected to the baseboard management controller 540 and may receive information such as a state of the storage device 100 from the storage device 100. The baseboard management controller 540 may receive information such as the state of the storage device 100 through the second input/output port 520 and may transfer the information to the central processing unit 530. In some example embodiments, the second input/output port 520 may be an Inter-Integrated Circuit (I2C) system management bus (SMBus) port. An operating frequency of the first input/output port 510 may be higher than an operating frequency of the second input/output port 520. For example, a first operating frequency of the first input/output port 510 may be high or higher than a second operating frequency of the second input/output port 520.

The central processing unit 530 may process data collected from a sensor and another control target device, and may provide a command for controlling the control target device based on the collected data. The central processing unit 530 may provide a command to the storage device 100 instructing the storage device 100 to perform an operation of writing the collected data to the storage device 100, and may transmit and/or send data corresponding to the command to the storage device 100. In some example embodiments, the central processing unit 530 may transmit and/or send at least one of log data, text data, and/or image data to the storage device 100 through the first input/output port 510.

The central processing unit 530 may transmit and/or send a command and data to the storage device 100 through the first input/output port 510. The central processing unit 530 may receive the state of the storage device 100 through the second input/output port 520 and the baseboard management controller 540. In some example embodiments, the electronic control unit 500 may further include a port connected to another electronic control unit. The electronic control unit 500 may transmit and/or send data to and receive data from the other electronic control unit through an Ethernet protocol.

According to some example embodiments, the electronic control unit 500 may be connected to the storage device 100 through the first input/output port 510 and the second input/output port 520. In some example embodiments, while the electronic control unit 500 transmits and/or sends data to the storage device 100, a defect may occur at the first input/output port 510 due to an external physical impact, and/or the like. For example, when a defect occurs at the first input/output port 510, the electronic control unit 500 may transmit and/or send the remaining data, not transmitted, to the storage device 100 through another electronic control unit or the second input/output port 520. Accordingly, even when a problem occurs at the first input/output port 510, the electronic control unit 500 may safely store data in the storage device through another electronic control unit or the second input/output port 520 without losing the data.

Figure 3:
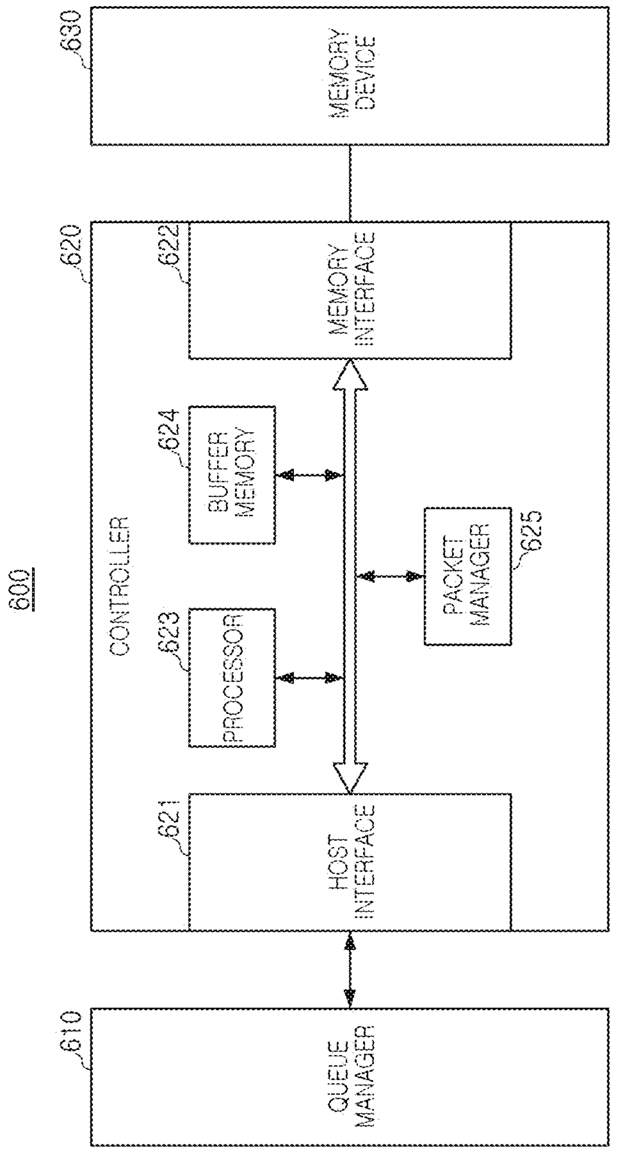
FIG. 3 is a block diagram illustrating a storage device according to some example embodiments.

FIG. 3 is a block diagram illustrating a storage device according to some example embodiments.

A system, such as system 10 illustrated in FIG. 1, according to some example embodiments may include a plurality of electronic control units (e.g., the plurality of electronic control units 200, 300, and 400 illustrated in FIG. 1) and a storage device 600. Referring to FIG. 3, the storage device 600 may include a queue manager 610, a controller 620, and a memory device 630.

The storage device 600 may include storage media for storing data according to a request of the electronic control unit. The storage device 600 may include at least one of a solid state drive (SSD), an embedded memory, and/or a removable external memory. For example, when the storage device 600 is configured as an SSD, the storage device 600 may be configured as a device complying with the non-volatile memory express (NVMe) standard.

The queue manager 610 may receive a command and data from the electronic control unit. The queue manager 610 may store the command received from the electronic control unit in a queue. In some example embodiments, the queue manager 610 may include a storage space for individual queues for each electronic control unit. In some example embodiments, the queue manager 610 may provide the state of the queue and the state of other electronic control units to the electronic control unit.

The controller 620 may include a host interface 621, a memory interface 622, a processor 623, a buffer memory 624, and a packet manager 625.

The host interface 621 may transmit and/or send a packet to and receive a packet from the queue manager 610. For example, a packet transmitted and/or sent from the queue manager 610 to the host interface 621 may include a command or data to be written to the memory device 630, and a packet transmitted and/or sent from the host interface 621 to the queue manager 610 may include a response to the command or data read from the memory device 630.

The memory interface 622 may transmit and/or send data to be written to the memory device 630, or may receive data read from the memory device 630. The memory interface 622 may be implemented to comply with a standard protocol such as Toggle or Open NAND Flash Interface (ONFI).

The buffer memory 624 may temporarily store data to be written to the memory device 630 or data to be read from the memory device 630. The buffer memory 624 may be provided in the controller 620, or may also be disposed externally of the controller 620.

The packet manager 625 may generate a different packet according to a protocol of an interface agreed upon with the electronic control unit, or may parse various information from a packet received from the electronic control unit.

The memory device 630 may include a flash memory maintaining stored data even when power is not supplied. The flash memory may include a 2D NAND memory array or a 3D (or vertical) NAND (VNAND) memory array. In some example embodiments, the storage device 600 may apply various types of memories such as magnetic RAM (MRAM), spin-transfer torque MRAM, conductive bridging RAM (CBRAM), ferroelectric RAM (FeRAM), phase RAM (PRAM), resistive RAM, and/or others.

In some example embodiments, a defect may occur in a port providing a command and data from an electronic control unit to the storage device 600 due to an external physical impact, or the like. For example, while the controller 620 receives data in response to a command transferred from the queue manager 610, a timeout state may occur in which data reception is not completed in a predetermined or alternatively, a desired period of time.

The queue manager 610 may transfer the timeout state of the command and the state of a queue of another electronic control unit to the electronic control unit. In some example embodiments, when the state has available capacity in the queue of the other electronic control unit, the electronic control unit providing a command in the timeout state may provide the remaining data, not received, to the storage device 600 through the other electronic control unit. Accordingly, the data corresponding to the command for which a timeout has been sensed may be stored in the storage device 600 without being lost.

Figure 4:
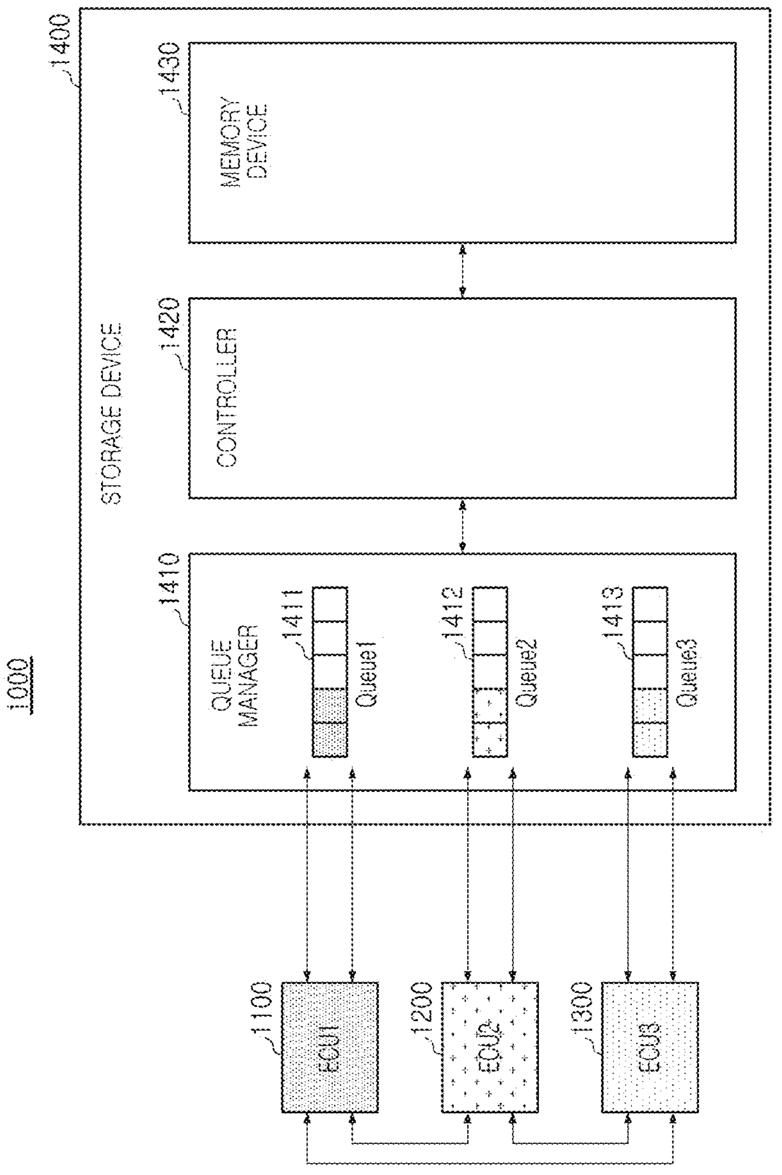
FIG. 4 is a block diagram illustrating operations of a storage device according to some example embodiments.

FIG. 4 is a block diagram illustrating operations of a storage device according to some example embodiments.

A system 1000 according to some example embodiments may include a plurality of electronic control units 1100, 1200, and 1300 and a storage device 1400. The plurality of electronic control units 1100, 1200, and 1300 may be connected to each other, and each of the plurality of electronic control units 1100, 1200, and 1300 may be connected to the storage device 1400 with two ports. For example, each electronic control unit of the plurality of electronic control units 1100, 1200, and 1300 may be connected the storage device 1400 with two ports.

A queue manager 1410 may include a plurality of queues 1411, 1412, and 1413 storing a command provided from each of the plurality of electronic control units 1100, 1200, and 1300. For example, a first queue 1411 may receive and store a first command from a first electronic control unit 1100, and a second queue 1412 may receive and store a second command from a second electronic control unit 1200. The number of the plurality of electronic control units 1100, 1200, and 1300 and the number of the plurality of queues 1411, 1412, and 1413 are not limited to the example illustrated in FIG. 4, and may be tens or hundreds in some example embodiments.

The queue manager 1410 may include a queue priority manager (not illustrated) that is configured to determine priorities of commands provided from the plurality of electronic control units 1100, 1200, and 1300 and transfer the commands to the controller 1420 according to the determined priorities. For example, the queue manager 1410 may receive a first command from the first electronic control unit 1100 and a second command from the second electronic control unit 1200. The queue priority manager may determine priorities of the first command and the second command and may transfer the first command and the second command to the controller 1420 according to the determined priorities. In some example embodiments, when the priorities of the first command and the second command are the same or substantially the same, the queue manager 1410 may transfer the first command and the second command to the controller 1420 in the order in which the first command and the second command are received.

The queue priority manager may determine the priorities according to the type of data corresponding to the command and/or the type of the electronic control unit providing the command. For example, when an accident occurs in a vehicle, the queue priority manager may raise the priorities of the commands corresponding to safety data, sensor data, and/or camera data and may transfer the commands to the controller 1420 preferentially. The queue priority manager may raise the priorities of the commands provided from the vehicle safety-related ECU, the brake and accident direction sensor-related ECU, and/or the camera-related ECU and may transfer the commands to the controller 1420 preferentially.

For example, the queue manager 1410 may receive the first command from the first electronic control unit 1100 and the second command from the second electronic control unit 1200. When the first data corresponding to the first command corresponds to one of safety data, sensor data, and/or camera data, and the second data corresponding to the second command does not correspond to any of safety data, sensor data, and/or camera data, the queue manager 1410 may transfer the first command to the controller 1420 preferentially. In some example embodiments, when the priorities of the first data corresponding to the first command and the second data corresponding to the second command are the same or substantially the same, the queue manager 1410 may transfer the commands to the controller 1420 in the order in which the commands are received.

For example, the safety data may be related to a collision, a safety belt, an airbag, and/or the like, sensed when an accident occurs in a vehicle. When the safety data is provided from a vehicle safety-related ECU, the queue priority manager may transfer the command corresponding to the safety data to the controller 1420 preferentially before other commands. In some example embodiments, the sensor data may be data such as vehicle speed, vehicle direction, vehicle impact, and brake state. For example, when the sensor data is provided from a brake and direction sensor related ECU, the queue priority manager may transfer the command corresponding to the sensor data to the controller 1420 before other commands. in some example embodiments, the camera data may be image data monitoring the surrounding and internal conditions of a vehicle. For example, when the camera data is provided from a camera related ECU or a magnitude of the data to be written to the memory device 1430 is relatively large, the queue priority manager may transfer the command corresponding to the camera data to the controller 1420 before other commands.

The queue manager 1410 may include a command manager (not illustrated) transferring the state of the plurality of queues 1411, 1412, and 1413 to the plurality of electronic control units 1100, 1200, and 1300. In some example embodiments, when a timeout is sensed while receiving data from the storage device 1400, the command manager may transfer the timeout state of the storage device 1400 to the electronic control unit.

In some example embodiments, the command manager may provide the state of a queue receiving and storing a command from the electronic control unit to the electronic control unit. For example, when the first queue 1411 receiving the command of the first electronic control unit 1100 is at maximum capacity or near maximum capacity, the command manager may transmit and/or send, to the first electronic control unit 1100, the state in which the first queue 1411 is at maximum capacity or near maximum capacity and the state in which the second queue 1412 has available capacity.

The queue manager 1410 may receive commands and data through a first input/output port of the electronic control unit, and may provide data read from the memory device 1430 to the electronic control unit through the first input/output port. The queue manager 1410 may provide the state of the storage device 1400 to the electronic control unit through a second input/output port. The state of the storage device 1400 may include information such as the state of the queue, the timeout state, and/or the like. In some example embodiments, the queue manager 1410 may also provide the state of another electronic control unit to the electronic control unit through the second input/output port.

Referring to FIG. 4, the first electronic control unit 1100 may provide the first command to the queue manager 1410 through the first input/output port of the first electronic control unit 1100 in order to store the first data generated from a sensor and an actuator, and/or the like, in the memory device 1430 of the storage device 1400. The queue manager 1410 may receive the first command and may store the first command in the first queue 1411, and may transfer the first command stored in the first queue 1411 to the controller 1420 according to priorities.

The controller 1420 may control the memory device 1430 in response to commands received from a plurality of queues 1411-1413. For example, the controller 1420 may receive the first data from the first electronic control unit 1100 in response to the first command, and may store the first data in the memory device 1430. After the memory device 1430 receives the entirety of the first data, the controller 1420 may provide a response to the queue manager 1410. For example, the completion may be stored in a completion queue paired with the first queue 1411. The queue manager 1410 may transfer completion to the first electronic control unit 1100, and the first electronic control unit 1100 may recognize that the operation of the first command has ended.

In some example embodiments, while the controller 1420 receives the first data from the first electronic control unit 1100, the first input/output port of the first electronic control unit 1100 may be damaged due to an external physical impact, and the storage device 1400 may sense a timeout. For example, due to the timeout state of the first command, the first queue 1411 including the first command may continuously occupy the queue manager 1410. For example, when the first queue 1411 continuously occupies the queue manager 1410, the queue manager 1410 may not be able to process other commands.

The queue manager 1410 may transmit and/or send the timeout state of the first command and the state of the second queue 1412 to the first electronic control unit 1100 through the second input/output port of the first electronic control unit 1100. The queue manager 1410 may receive the remaining first data through the second electronic control unit 1200 or the second input/output port of the first electronic control unit 1100. In some example embodiments, the queue manager 1410 may receive the second command from the second electronic control unit 1200, and may receive the remaining data, not received, of the first data in response to the second command.

Accordingly, the storage device 1400 may prevent and/or mitigate loss of the first data by storing the first data in the memory device 1430, and by relieving the state in which the first queue 1411 occupies the queue manager 1410, performance of the storage device 1400 may be optimized and/or improved.

Figure 5:
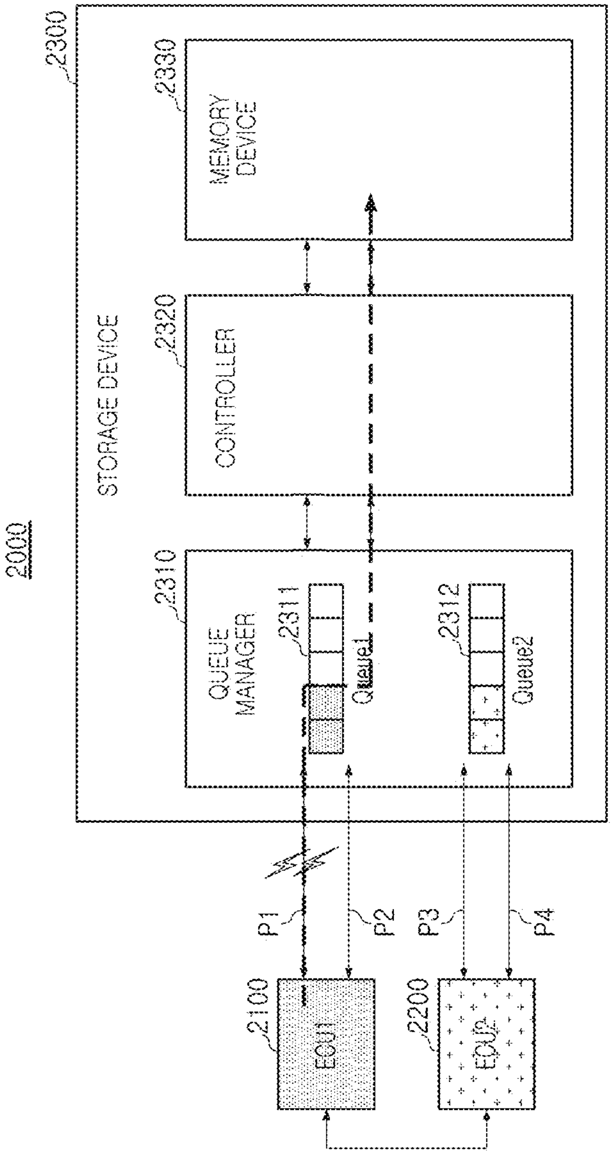
FIGS. 5 and 6 are diagrams illustrating operations of a system according to some example embodiments.
Figure 6:
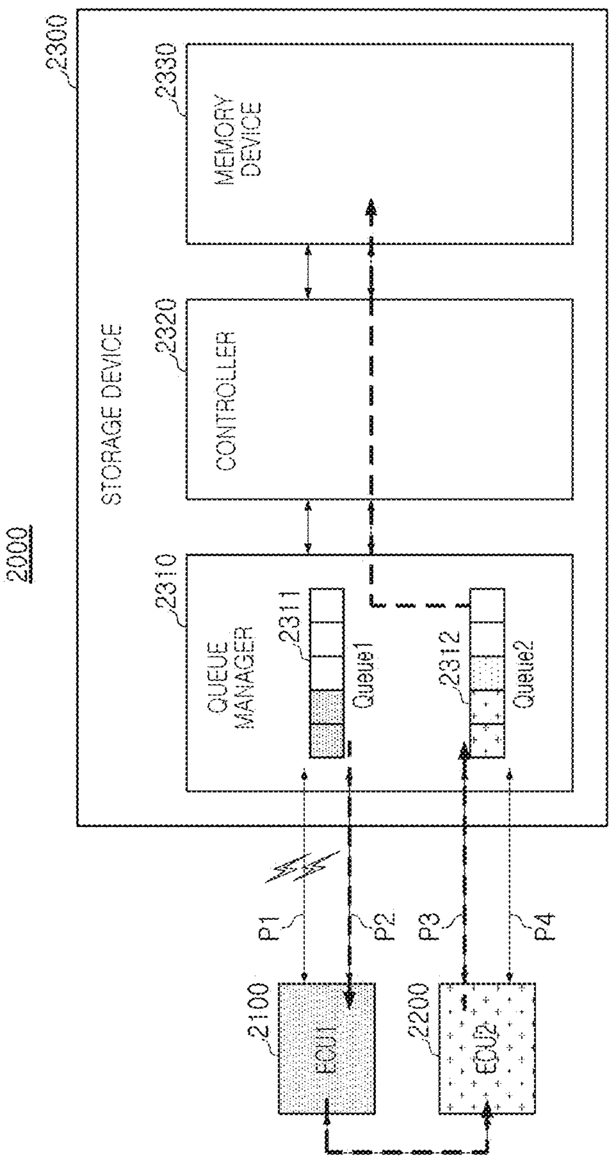

FIGS. 5 and 6 are diagrams illustrating operations of a system according to some example embodiments.

Referring to FIG. 5, a system 2000 according to some example embodiments may include a plurality of electronic control units 2100 and 2200 and a storage device 2300. The plurality of electronic control units 2100 and 2200 may be connected to the storage device 2300 through first input/output ports P1 and P3 and second input/output ports P2 and P4, respectively. For example, the first electronic control unit 2100 may be connected to the storage device 2300 through a first input/output port P1 and a second input/output port P2, and the second electronic control unit 2200 may be connected to the storage device 2300 through a first input/output port P3 and a second input/outport P4. The storage device 2300 may include a queue manager 2310, a controller 2320, and a memory device 2330.

The plurality of electronic control units 2100 and 2200 may provide commands and corresponding data to the storage device 2300 through the first input/output ports P1 and P3. The storage device 2300 may provide the state of the storage device 2300 to the plurality of electronic control units 2100 and 2200 through the second input/output ports P2 and P4, respectively. The state of the storage device 2300 may include information such as a timeout state and a capacity state of a queue.

For example, the first electronic control unit 2100 may be connected to the storage device 2300 through the first input/output port P1 and the second input/output port P2, and the second electronic control unit 2200 may be connected to the storage device 2300 through the first input/output port P3 and the second input/output port P4.

Referring to FIG. 5, the first electronic control unit 2100 may provide the first command to the queue manager 2310 of the storage device 2300. The queue manager 2310 may store the received first command in the first queue 2311. The first command may include information about a write operation, a magnitude of the first data, and/or a type of the first electronic control unit.

The queue manager 2310 may transfer the first command to the controller 2320 according to priorities. The controller 2320 may receive the first data in response to the first command and may write the received first data to the memory device 2330 of the storage device 2300.

In some example embodiment the the first input/output port P1 of the first electronic control unit 2100 may be damaged due to a physical impact such as a vehicle accident, and the controller 2320 may sense a timeout while receiving the first data from the first electronic control unit 2100. The first command may include information about the type of operation to be performed, the magnitude of the first data, the importance of the operation, and the first electronic control unit 2100 providing the first command. The storage device 2300 may determine the timeout state of the first command when data having a magnitude smaller than the magnitude of the first data is received during a predetermined or alternatively, a desired period of time.

Referring to FIG. 6, the queue manager 2310 may transfer the timeout state of the first command to the first electronic control unit 2100 through the second input/output port P2 of the first electronic control unit 2100. The queue manager 2310 may also transfer the state of the second queue 2312 receiving and storing the command of the second electronic control unit 2200 to the first electronic control unit 2100.

The first electronic control unit 2100 may receive a timeout state of the first command from the queue manager 2310 and may recognize a defect of the first input/output port P1 of the first electronic control unit 2100. In some example embodiments, when there is available capacity in the second queue 2312, the first electronic control unit 2100 may transmit and/or send the remaining first data to the second electronic control unit 2200, which is, for example, one of a plurality of electronic control units. In some example embodiments, the first electronic control unit 2100 and the second electronic control unit 2200 may transmit and/or send and receive data using an Ethernet protocol. The second electronic control unit 2200 may transmit and/or send the remaining first data to the queue manager 2310 through the first input/output port P3 of the second electronic control unit 2200.

The second electronic control unit 2200 may transmit and/or send the remaining first data together with the second command to the storage device 2300. The second command may include information about the type of operation, information about the magnitude of the remaining first data, and source information indicating that the remaining first data is transmitted and/or sent from the first electronic control unit 2100. After receiving the remaining first data from the second electronic control unit 2200, the queue manager 2310 may transfer the completion to the second electronic control unit 2200.

In some example embodiments, the second electronic control unit 2200 may provide the second command to the queue manager 2310, or the second queue 2312 may be in a state in which capacity has reached maximum capacity or near maximum capacity. For example, when the second command is a write command, the queue manager 2310 may process the read command stored in the second queue 2312 as a fail state and may receive the remaining first data in response to the second command.

In some example embodiments, in an emergency circumstance, such as a vehicle accident, the write command may instruct an operation of writing critical data related to the vehicle accident. Accordingly, in the event of a vehicle accident, the importance of a read command instructing to perform an operation of reading data from the memory device 2330 may be lower than the importance of a write command instructing to perform an operation of writing data to the memory device 2330.

The queue manager 2310 may provide information about a failure state of a read command stored and waiting in the second queue 2312 through the second input/output port P4 of the second electronic control unit 2200 to the second electronic control unit 2200. The second electronic control unit 2200 may recognize the failure state of the read command and may retransmit and/or resend the command to the queue manager 2310 when there is available capacity in the second queue 2312.

According to some example embodiments, the storage device 2300 may receive the remaining first data through the second electronic control unit 2200 even when a defect occurs in the first input/output port P1 of the first electronic control unit 2100 while receiving the first data from the first electronic control unit 2100. Accordingly, the storage device 2300 may store the first data in the memory device 2330, and by relieving the state in which first queue 2311 occupies the storage device 2300 due to the timeout state of the first command, performance of the system 2000 may be optimized and/or improved.

Figure 7:
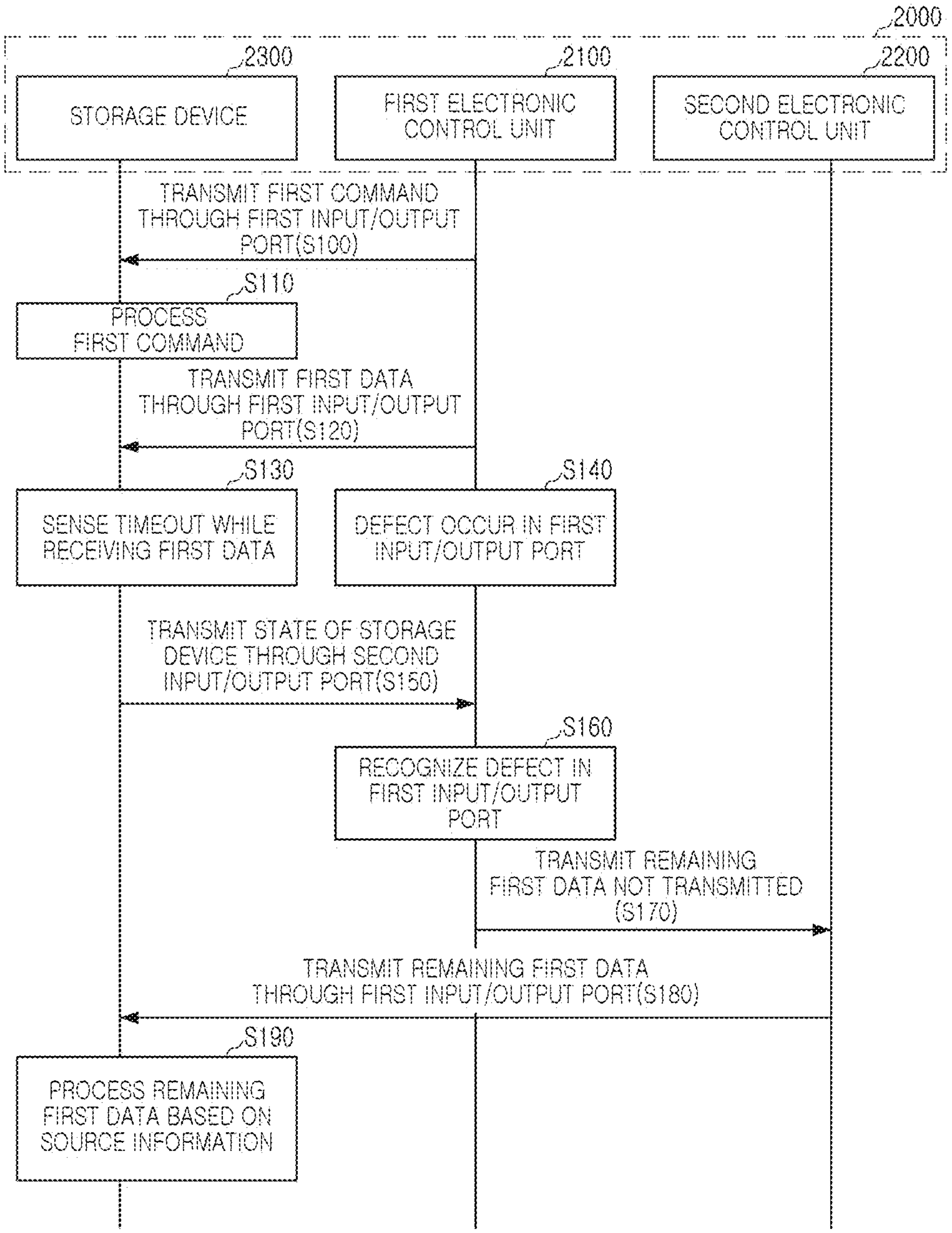
FIG. 7 is a flowchart illustrating operations of a system according to some example embodiments.

FIG. 7 is a flowchart illustrating operations of a system according to some example embodiments.

According to some example embodiments, a system 2000 may include a storage device 2300 and a plurality of electronic control units 2100 and 2200. The plurality of electronic control units 2100 and 2200 may be connected to each other and may be respectively connected to one storage device 2300 with two ports. The system 2000, the storage device 2300, the plurality of electronic control units 2100 and 2200, may be the same and/or similar to the system 200, storage device 2300, and plurality of electronic control units 2100 and 2200 described with reference to FIG. 6, and thus duplicate description will not be repeated herein.

Referring to FIG. 7, the first electronic control unit 2100 may transmit and/or send a first command to the storage device 2300 through a first input/output port (S100). The first command may be a command instructing the first electronic control unit 2100 to perform an operation of writing first data collected from a sensor and an actuator, and/or the like, to a memory device of the storage device 2300. A queue manager included in the storage device 2300 may receive the first command and store the command in the first queue.

The storage device 2300 may process the first command received from the first electronic control unit 2100 (S110). The queue manager may transfer the first command received from the first electronic control unit 2100 to the controller included in the storage device 2300.

The first electronic control unit 2100 may transmit and/or send the first data through the first input/output port (S120). The controller may receive the first data corresponding to the first command from the first electronic control unit 2100 and may write the received first data to the memory device of the storage device 2300.

The system 2000 according to some example embodiments may be damaged and/or the function thereof may be interrupted due to, for example, an impact in the event of a vehicle accident. For example, a physical impact occurring in collision between vehicles may cause a connection defect in a circuit, and a normal operation of the system 2000 may be interrupted. In some example embodiments, a defect may occur in the first input/output port transmitting and/or sending the first data due to a vehicle accident, or the like (S140), and the storage device 2300 may sense a timeout for the first command while receiving the first data from the first electronic control unit 2100 (S130).

The storage device 2300 may transmit and/or send the state of the storage device through the second input/output port of the first electronic control unit 2100 (S150). The state of the storage device 2300 may include information such as the timeout state of the first command and the capacity state of the second queue. In some example embodiments, when data having a magnitude smaller than the magnitude of the first data is received during a predetermined or alternatively, a desired period of time, the state may be determined as the timeout state of the first command.

The first electronic control unit 2100 may recognize a defect in the first input/output port (S160). The first electronic control unit 2100 may receive the timeout state of the first command from the storage device 2300 and may recognize that the timeout state is due to a defect in the first input/output port.

The first electronic control unit 2100 may transfer the remaining first data, not transmitted, to the second electronic control unit 2200 (S170). For example, when there is available capacity in the second queue, the first electronic control unit 2100 may transfer the remaining first data to the second electronic control unit 2200.

The second electronic control unit 2200 may transfer the remaining first data through the first input/output port (S180). The second electronic control unit 2200 may provide a second command to the storage device 2300 instructing to perform an operation of writing the first data to a memory device. The second command may include magnitude information of the remaining first data and source information indicating that the remaining first data is transmitted and/or sent from the first electronic control unit 2100.

The storage device 2300 may process the remaining first data received from the second electronic control unit 2200 as data received from the first electronic control unit 2100 based on the source information (S190). The storage device 2200 may recognize that the remaining first data received from the second electronic control unit 2200 is data transmitted and/or sent from the first electronic control unit 2100 based on the source information included in the second command. The storage device 2300 may store a portion of the first data received from the first electronic control unit 2100 and another portion of the first data received from the second electronic control unit 2200 together in the memory device of the storage device 2300.

According to some example embodiments, the storage device 2300 may receive the remaining first data through the second electronic control unit 2200 even when a defect occurs in the first input/output port while receiving the first data from the first electronic control unit 2100. Accordingly, storage device 2300 may store the first data in the memory device even when a defect occurs in the first input/output port, and may optimize performance of the system 2000 by relieving the state in which the first queue continuously occupies the storage device 2300 due to the timeout state of the first command.

Figure 8:
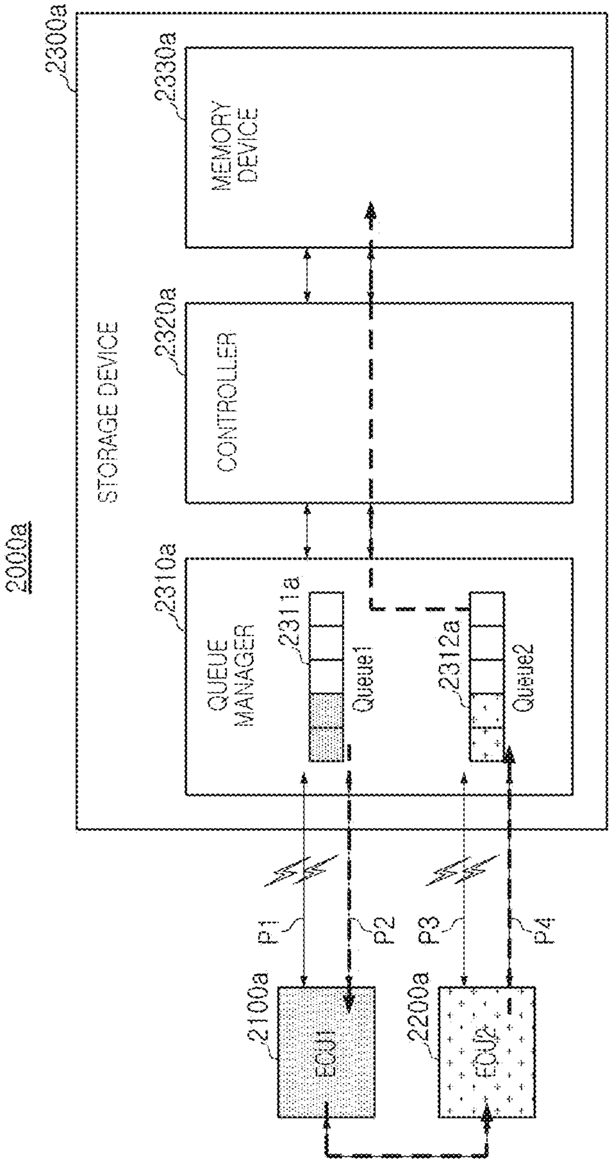
FIG. 8 is a diagram illustrating operations of a system according to some example embodiments.

FIG. 8 is a diagram illustrating operations of a system according to some example embodiments.

A system 2000*a* in FIG. 8 may be similar to the system 2000 described with reference to FIG. 5. In the description below, operations of the system 2000*a* in FIG. 8 will be described focusing on differences from the system 2000 in FIG. 5.

As described with reference to FIG. 5, the first input/output port P1 of the first electronic control unit 2100*a* may experience an abnormality, such as disconnection due to a vehicle accident, and the controller 2320*a* may sense a timeout while receiving first data from a first electronic control unit 2100*a*.

Referring to FIG. 8, the queue manager 2310*a* may transfer the timeout state of the first command to the first electronic control unit 2100*a* through the second input/output port P2 of the first electronic control unit 2100*a*. The queue manager 2310*a* may transmit and/or send the state of the second queue 2312*a* together with the first electronic control unit 2100.

In some example embodiments, when the second queue 2312*a* of the second electronic control unit 2200*a* has available capacity, the first electronic control unit 2100*a* may transmit and/or send the remaining first data, not transmitted, to the second electronic control unit 2200*a*. The second electronic control unit 2200*a* may also be damaged due to an external physical impact, and/or the like, when a vehicle accident occurs. In some example embodiments, after the second electronic control unit 2200*a* receives the remaining first data from the first electronic control unit 2100*a*, the second electronic control unit 2200*a* may recognize a defect in the first input/output port P3.

The method and/or operation by which the second electronic control unit 2200*a* recognizes a defect in the first input/output port P3 of the second electronic control unit 2200*a* may be similar to the method by which the first electronic control unit 2100 recognizes a defect in the first input/output port P1 of the first electronic control unit 2100 in FIG. 5. In some example embodiments, the queue manager 2310*a* may sense a timeout while receiving second data in response to a second command received from the second electronic control unit 2200*a* through the first input/output port P3 of the second electronic control unit 2200*a*. The queue manager 2310*a* may transfer a timeout state to the second electronic control unit 2200*a* through the second input/output port P4 of the second electronic control unit 2200*a*, and the second electronic control unit 2200*a* may recognize a defect in the first input/output port P3 of the second electronic control unit 2200*a*.

For example, when the second electronic control unit 2200*a* recognizes the defect in the first input/output port P3 of the second electronic control unit 2200*a* after receiving the remaining first data from the first electronic control unit 2100*a*, the second electronic control unit 2200*a* may provide the remaining first data to the queue manager 2310*a* through the second input/output port P4 of the second electronic control unit 2200*a*. The queue manager 2310*a* may receive the remaining first data through the second electronic control unit 2200*a* and may write the first data to the memory device 2330*a*.

According to some example embodiments, the first electronic control unit 2100*a* may transfer the remaining first data through the second electronic control unit 2200*a* even when a defect occurs in the first input/output port P1 of the first electronic control unit 2100*a* while transmitting and/or sending the first data to the storage device 2300*a*. After the second electronic control unit 2200*a* receives the remaining first data, when recognizing a defect in the first input/output port P3 of the second electronic control unit 2200*a*, the second electronic control unit 2200*a* may provide the remaining first data to the queue manager 2310*a* through the second input/output port P4 of the second electronic control unit 2200*a*.

Accordingly, the storage device 2300*a* may store the first data in the memory device 2330*a*, and by relieving the state in which the first queue 2311*a* occupies the storage device 2300*a* due to the timeout state of the first command, performance of the system 2000*a* may be optimized and/or improved.

Figure 9:
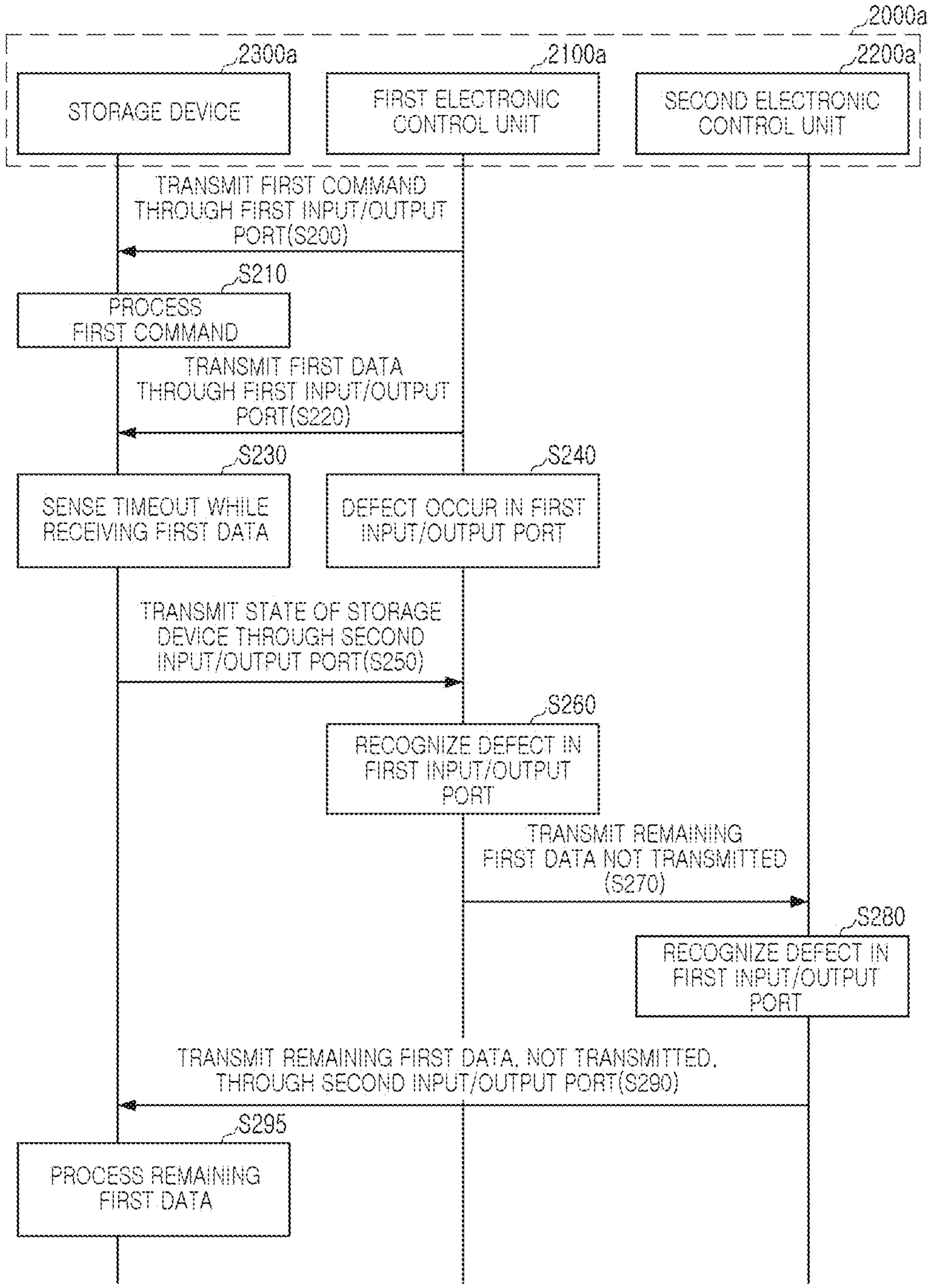
FIG. 9 is a flowchart illustrating operations of a system according to some example embodiments.

FIG. 9 is a flowchart illustrating operations of a system according to some example embodiments.

According to some example embodiments, a system 2000*a* may include a storage device 2300*a* and a plurality of electronic control units 2100*a* and 2200*a*. The plurality of electronic control units may be connected to each other and may be connected to one storage device 2300*a*. According to some example embodiments, the system 2000*a*, the storage device 2300*a*, and the plurality of electronic control units 2100*a* and 2200*a* may be the same or similar as those described with reference to FIG. 8, and thus duplicate descriptions will not be repeated herein.

The first electronic control unit 2100*a* may provide, to the storage device 2300*a*, a first command instructing the storage device 2300*a* to perform an operation of writing first data collected from a sensor and an actuator, and/or the like, to the storage device 2300*a* (S200). The storage device 2300*a* may receive the first data from the first electronic control unit 2100*a* in response to the first command (S210 and S220). A defect may occur in the first input/output port of the first electronic control unit 2100*a* due to a physical impact, and/or the like, occurring when a vehicle crashes (S240). The storage device 2300*a* may sense a timeout while receiving the first data from the first electronic control unit 2100*a* (S230).

The storage device 2300*a* may transmit and/or send a storage state including information about a timeout state of the first command and a state of the second queue to the second input/output port of the first electronic control unit 2100*a* (S250). The first electronic control unit 2100*a* may receive the timeout state of the first command, and the timeout state of the storage device 2300*a* may recognize a defect of the first input/output port (S260). In some example embodiments, in a state in which there is available capacity in the second queue, the first electronic control unit 2100*a* may transmit and/or send the remaining first data, not transmitted and/or sent to the storage device 2300*a*, to the second electronic control unit 2200*a* (S270).

In some example embodiments, the second electronic control unit 2200*a* may recognize a defect in the first input/output port of the second electronic control unit 2200*a* after receiving the remaining first data from the first electronic control unit 2100*a* (S280). The second electronic control unit 2200*a* may provide the remaining first data, not transmitted and/or sent to the storage device 2300*a*, to the storage device 2300*a* through the second input/output port (S290).

The storage device 2300*a* may process the remaining first data received from the second electronic control unit 2200*a* as data received from the first electronic control unit 2100*a* (S295). A queue manager of the storage device 2300*a* may receive the remaining first data through the second input/output port of the second electronic control unit 2200*a* and may transfer the received remaining first data to a controller of the storage device 2300*a*. The controller may process the remaining first data as the first data received from the first electronic control unit 2100*a* and may store the remaining first data in the memory device of the storage device 2300*a*.

In the system 2000*a* according to some example embodiments, even when a defect occurs in the first input/output port of the first electronic control unit 2100*a*, the remaining first data may be transmitted and/or sent through the second input/output port of the second electronic control unit 2200*a*. The storage device 2300*a* may store the first data in the memory device without losing the data, and by relieving the state in which the first queue continuously occupies the storage device 2300*a* due to the timeout state of the first command, performance of the system 2000*a* may be optimized and/or improved.

Figure 10:
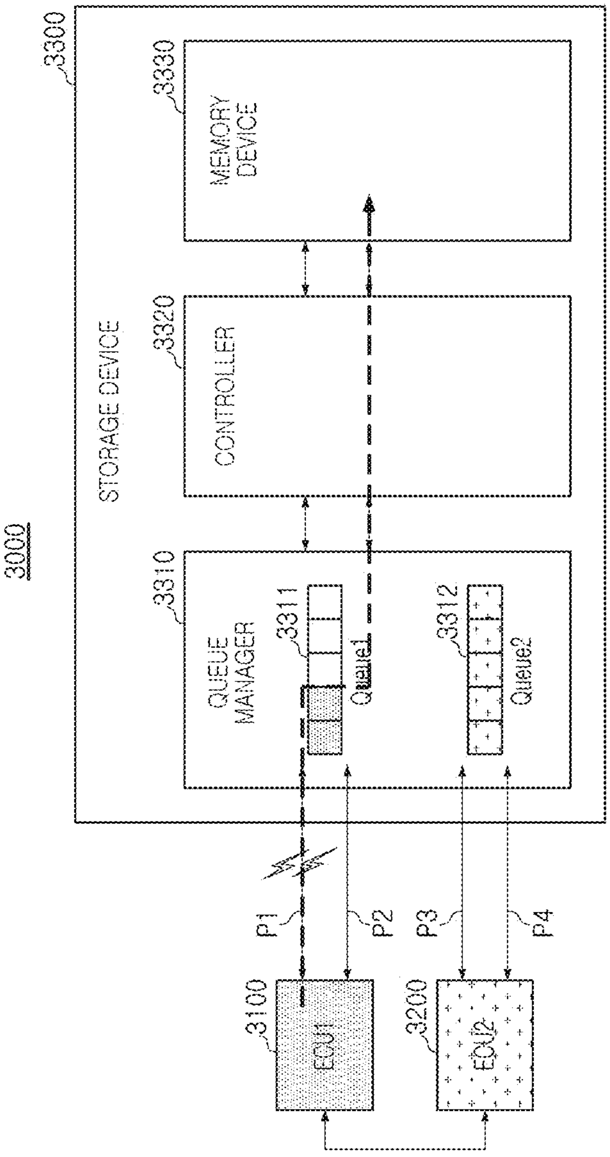
FIGS. 10, 11, and 12 are diagrams illustrating operations of a system according to some example embodiments.
Figure 11:
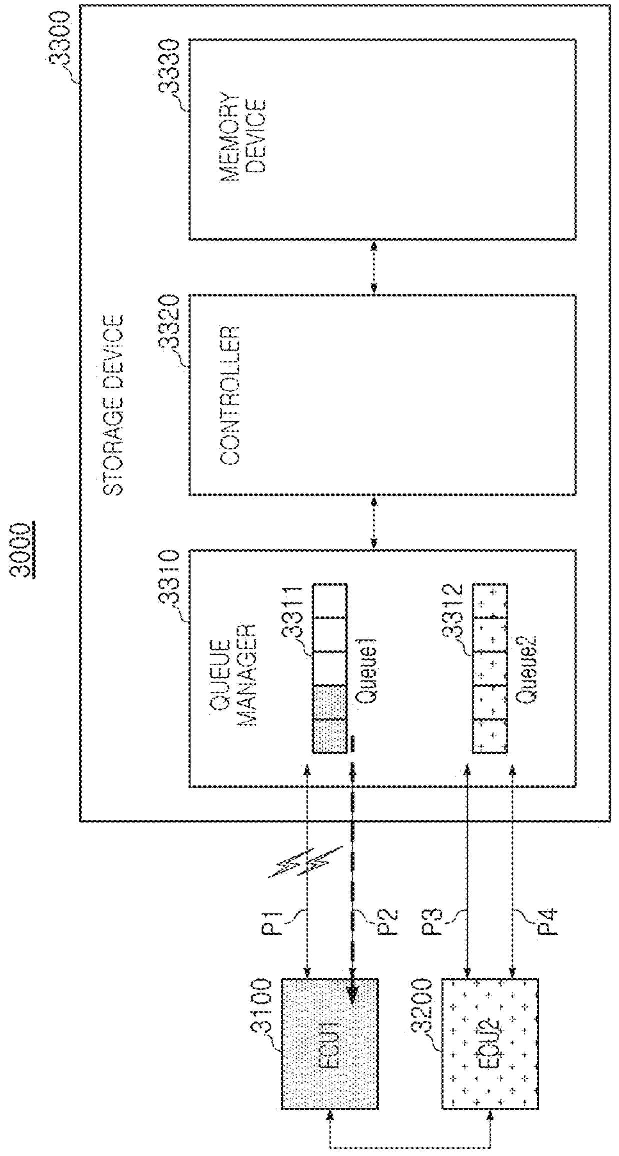
Figure 12:
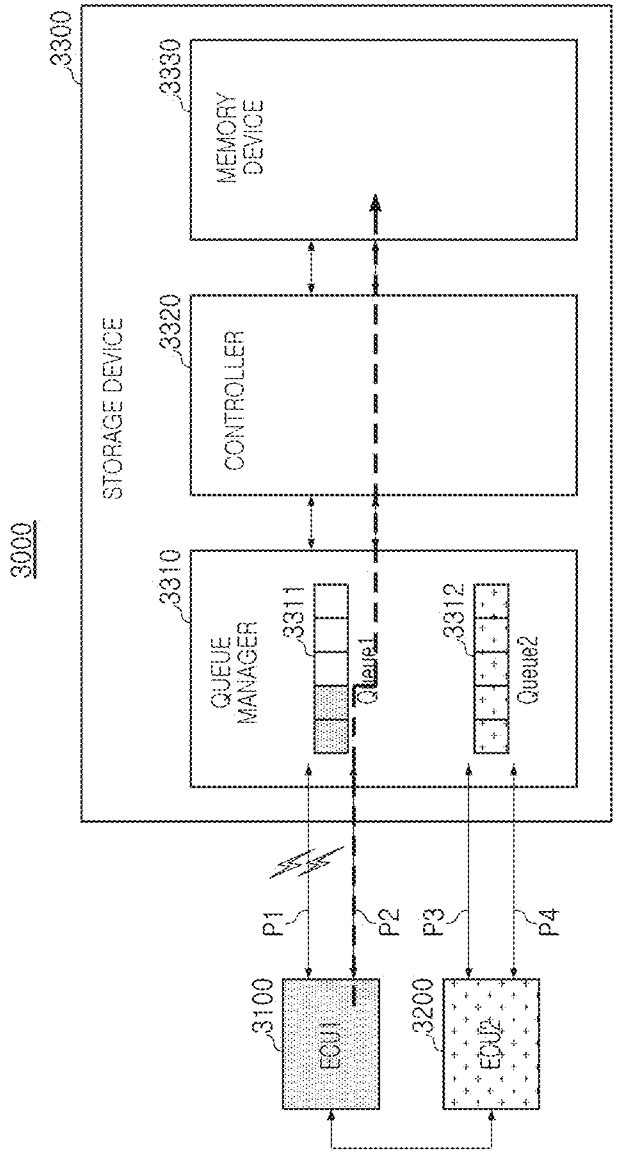

FIGS. 10, 11, and 12 are diagrams illustrating operations of a system according to some example embodiments.

Referring to FIG. 10, a system 3000 according to some example embodiments may include a plurality of electronic control units 3100 and 3200 and a storage device 3300. The plurality of electronic control units 3100 and 3200 may be connected to the storage device 3300 through first input/output ports P1 and P3 and second input/output ports P2 and P4, respectively. For example, a first electronic control unit 3100 may be connected to the storage device 3000 through a first input/output port P1 and a second input/output port P2, and the second electronic control unit 3200 may be connected to the storage device 3000 through a first input/output port P3 and a second input/output port P4. The storage device 3300 may include a queue manager 3310, a controller 3320, and a memory device 3330.

The plurality of electronic control units 3100 and 3200 may provide commands and corresponding data to the storage device 3300 through the first input/output ports P1 and P3. The storage device 3300 may provide the state of the storage device 3300 to the plurality of electronic control units 3100 and 3200 through the second input/output ports P2 and P4, respectively. The state of the storage device 3300 may include information such as a timeout state and a capacity state of a queue.

Referring to FIG. 10, the first electronic control unit 3100 may provide the first command to the queue manager 3310 through the first input/output port P1. The queue manager 3310 may store the first command received from the first electronic control unit 3100 in the first queue 3311. The queue manager 3310 may transfer the first command to the controller 3320 according to priorities, and the controller 3320 may receive the first data in response to the first command and may write the received first data to the memory device 3330 of the storage device 3300.

In some example embodiments, a defect may occur in the first input/output port P1 of the first electronic control unit 3100 due to physical impact, and/or the like, when a vehicle crashes, and the controller 3320 may sense a timeout while receiving the first data from the first electronic control unit 3100.

Referring to FIG. 11, the queue manager 3310 may provide the timeout state of the first command to the first electronic control unit 3100 through the second input/output port P2 of the first electronic control unit 3100. The queue manager 3310 may also provide the state of the second queue 3312 which stores the command received from the second electronic control unit 3200 through the second input/output port P2 to the first electronic control unit 3100. Referring to FIG. 11, since the second queue 3312 is in a state of maximum capacity or near maximum capacity, the queue manager 3310 may provide the state in which there is no available capacity in the second queue 3312 to the first electronic control unit 3100.

Referring to FIG. 12, the first electronic control unit 3100 may receive the timeout state of the first command and may recognize the defect of the first input/output port P1 of the first electronic control unit 3100. Since the first electronic control unit 3100 is provided with information about the state in which there is no available capacity in the second queue 3212, instead of providing the remaining first data, not transmitted, to the second electronic control unit 3200, the remaining first data may be provided to the queue manager 3310 through the second input/output port P2 of the first electronic control unit 3100.

In some example embodiments, an operating frequency of the first input/output port P1 of the first electronic control unit 3100 may be higher than an operating frequency of the second input/output port P2 of the first electronic control unit 3100. For example, the first input/output port P1 may be configured as a PCIe port, and the second input/output port P2 may be configured as an I2C SMBus port. Accordingly, when transmitting and/or sending data through the second input/output port P2, the transmission speed may be slower than when transmitting and/or sending data through the first input/output port P1.

In a system 3000 according to some example embodiments, even when a defect may occur in the first input/output port P1 of the first electronic control unit 3100 and there may be no available capacity in the queue of another electronic control unit, the remaining first data may be transmitted and/or sent through the second input/output port P2 of the first electronic control unit 3100. In some example embodiments, when the first electronic control unit 3100 transmits and/or sends the remaining first data through the second input/output port P2, the storage device 3300 may store the first data in the memory device 3330 without losing the data. By relieving the state in which the first queue 3311 continuously occupies the storage device 3300 due to the timeout state of first command, the storage device 3300 may optimize and/or improve performance of the system 3000.

Figure 13:
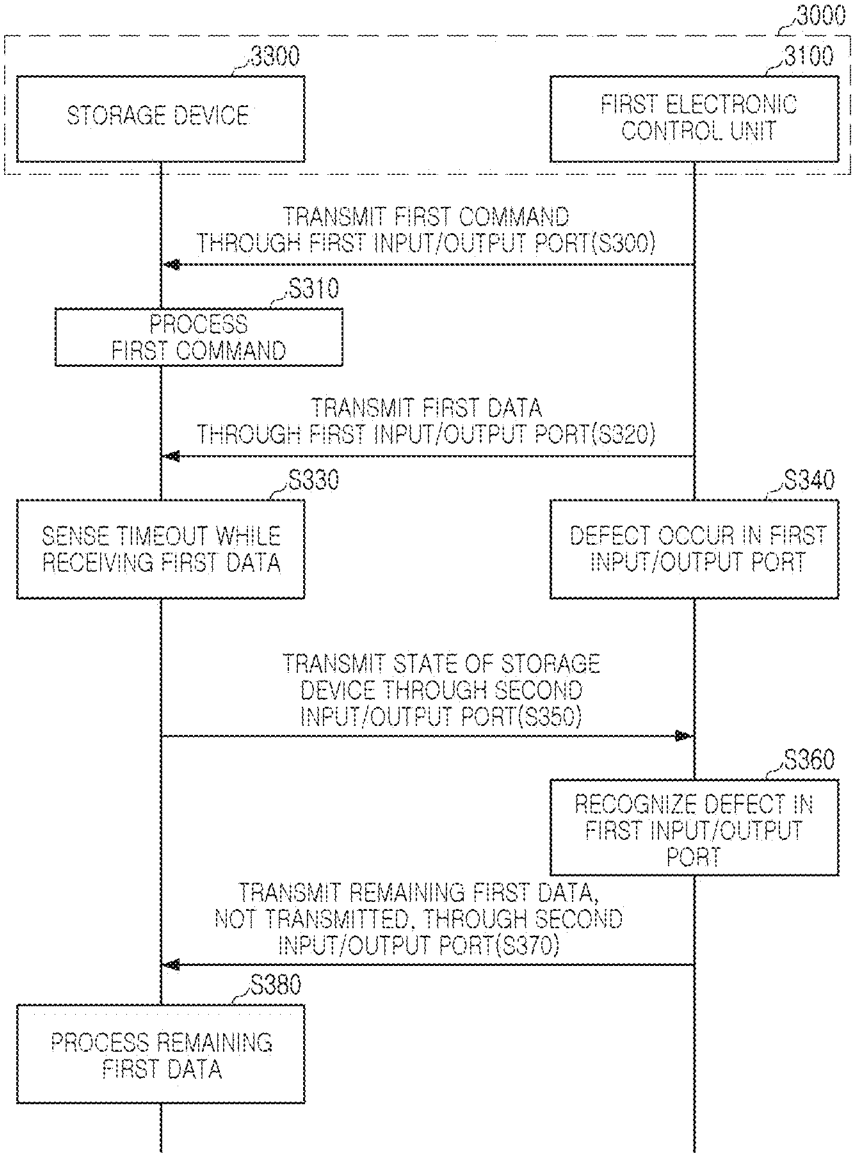
FIG. 13 is a flowchart illustrating operations of a system according to some example embodiments.

FIG. 13 is a flowchart illustrating operations of a system according to some example embodiments.

Referring to FIG. 13, a first electronic control unit 3100 may transmit and/or send, to the storage device 3300, a first command instructing the storage device 3300 to perform an operation of writing first data to a memory device included in the storage device 3300 (S300). The controller of the storage device 3300 may process the first command (S310). The controller may receive the first data transmitted and/or sent from the first electronic control unit 3100 through the first input/output port in response to the first command (S320).

In some example embodiments, a defect may occur in the first input/output port of the first electronic control unit 3100 due to a physical impact, such as a vehicle collision (S340). Accordingly, the storage device 3300 may sense a timeout while the controller of the storage device 3300 receives the first data (S330).

The storage device 3300 may provide the state of the storage device 3300 to the first electronic control unit 3100 through the second input/output port (S350). The information about the state of the storage device 3300 may include information about the timeout state of the first command and the state of the second queue. The second queue may be a queue storing a command received from the second electronic control unit in a queue manager included in the storage device 3300.

The first electronic control unit 3100 may receive information about the timeout state of the first command from the storage device 3300 and may recognize a defect in the first input/output port (S360). In some example embodiments, the first electronic control unit 3100 may receive information about a state in which there is no available capacity in the second queue and may transmit and/or send the remaining first data, not transmitted and/or sent, through the second input/output port of the first electronic control unit 3100 (S370).

The storage device 3300 may process the remaining first data received from the second input/output port of the first electronic control unit 3100 as data received from the first electronic control unit 3100 (S380). The queue manager of the storage device 3300 may receive the remaining first data through the second input/output port of the first electronic control unit 3100 and may transfer the received first data to the controller of the storage device 3300. The controller may process the remaining first data as first data and may store the data in a memory device.

In the system 3000 according to some example embodiments, even when a defect occurs in the first input/output port of the first electronic control unit 3100 and there is no available capacity in the queue of another electronic control unit, the remaining first data may be transmitted and/or sent through the second input/output port of the first electronic control unit 3100. When the first electronic control unit 3100 transmits and/or sends the remaining first data through the second input/output port, the storage device 3300 may store the first data in the memory device without losing the data. By relieving the state in which the first queue continuously occupies the storage device 3300 due to the timeout state of the first command, the storage device 3300 may optimize and/or improve performance of the system 3000.

According to some example embodiments, the first electronic control unit may be connected to the storage device through the first input/output port and the second input/output port. When the storage device senses a timeout while receiving the first data in response to the first command, the storage device may receive the remaining first data, not transmitted and/or sent, through the second electronic control unit or the second input/output port of the first electronic control unit, such that the storage device may stably store the first data in the memory device without losing the data, and by relieving the state in which the first queue storing the first command continuously occupies the storage device in the timeout state, performance of the system may be optimized and/or improved.

As described herein, any devices, electronic devices, modules, units, and/or portions thereof according to any of the example embodiments, and/or any portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Any of the memories described herein may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

Further, any or all of the elements described with reference to the figures may communicate with any or all other elements described with reference to the figures. For example, any element may engage in one-way and/or two-way and/or broadcast communication with any or all other elements in the figures, to transfer and/or exchange and/or receive information such as but not limited to data and/or commands, in a manner such as in a serial and/or parallel manner, via a bus such as a wireless and/or a wired bus (not illustrated). The information may be encoded in various formats, such as in an analog format and/or in a digital format.

While some example embodiments have been illustrated and described above, it will be apparent to those skilled in the art that modifications and variations could be made without departing from the scope of the present inventive concepts as defined by the appended claims.

What is claimed is:

1. A system, comprising:

a storage device including a queue manager, a controller, and a memory device; and a plurality of electronic control units, each electronic control unit of the plurality of electronic control units configured to connect to the storage device with a first input/output port and a second input/output port, the second input/output port having a first type different than a second type of the first input/output port, the plurality of electronic control units including a first electronic control unit, the first electronic control unit configured to send a first command to the queue manager through the first input/output port of the first electronic control unit, the storage device configured to send a timeout state of the first command to the first electronic control unit through the second input/output port of the first electronic control unit in response to the storage device sensing a timeout while receiving first data from the first electronic control unit in response to the first command, and the first electronic control unit is configured to send remaining first data, not sent, selectively through a second electronic control unit of the plurality of electronic control units or through the second input/output port of the first electronic control unit to the queue manager in response to the timeout state.

2. The system of claim 1, wherein the first command further includes magnitude information of the first data, and the storage device is configured to determine a state as the timeout state of the first command in response to receiving data having a magnitude smaller than a magnitude of the first data in a period of time.

3. The system of claim 1, wherein the second electronic control unit is configured to send the remaining first data to the storage device together with a second command, and the second command includes magnitude information of the remaining first data and source information indicating that the remaining first data is sent from the first electronic control unit.

4. The system of claim 1, wherein the first electronic control unit is configured to receive the timeout state of the first command and recognize a defect in the first input/output port of the first electronic control unit.

5. The system of claim 1, wherein the first electronic control unit is configured to receive a state of a queue of the second electronic control unit from the queue manager through the second input/output port of the first electronic control unit.

6. The system of claim 5, wherein the first electronic control unit is configured to send the remaining first data to the queue manager through the first input/output port of the second electronic control unit in response to the queue of the second electronic control unit having an available capacity.

7. The system of claim 5, wherein the first electronic control unit is configured to send the remaining first data to the queue manager through the second input/output port of the first electronic control unit in response to the queue of the second electronic control unit having no available capacity.

8. The system of claim 5, wherein the second electronic control unit is configured to send the remaining first data to the queue manager through the second input/output port of the second electronic control unit in response to recognizing a defect in the first input/output port of the second electronic control unit after the first electronic control unit sends the remaining first data to the second electronic control unit.

9. The system of claim 1, wherein the first input/output port is a peripheral component interconnect express (PCIe) port, and the second input/output port is an Inter-Integrated Circuit (I2C) system management bus (SMBus) port.

10. The system of claim 1, wherein the plurality of electronic control units are interconnected and are configured to communicate using an Ethernet Protocol.

11. An electronic control unit, comprising:

a central processing unit;

a baseboard management controller;

a first input/output port configured to send a command and data corresponding to the command to a storage device; and a second input/output port connected to the baseboard management controller, the second input/output port configured to receive a state of the storage device, the central processing unit configured to send a first command and first data to the storage device through the first input/output port, receive a timeout state of the first command from the storage device through the second input/output port, and send remaining first data, not sent, among the first data to the storage device through the second input/output port or through another electronic control unit in response to the timeout state.

12. The electronic control unit of claim 11, wherein a first operating frequency of the first input/output port is higher than a second operating frequency of the second input/output port.

13. The electronic control unit of claim 11, wherein the baseboard management controller is directly connected to the second input/output port, and the baseboard management controller is configured to receive the timeout state of the first command from the storage device and transfer the timeout state to the central processing unit.

14. The electronic control unit of claim 11, wherein the central processing unit is configured to send at least one of log data, text data, or image data to the storage device through the first input/output port.

15. A storage device, comprising:

a memory device configured to store data;

a queue manager including a first queue and a second queue, the first queue configured to receive a first command from a first electronic control unit, and the second queue configured to receive a second command from a second electronic control unit; and a controller configured to control the memory device in response to the first command received from the first queue and the second command received from the second queue, the queue manager configured to, in response to sensing a timeout while receiving first data in response to the first command stored in the first queue, send a timeout state for the first command and a first state of the second queue to the first electronic control unit, and receive remaining first data, not received, among the first data in response to the second command received from the second electronic control unit.

16. The storage device of claim 15, wherein the second command includes source information indicating that the remaining first data is sent from the first electronic control unit, and the controller is configured to process the remaining first data received from the second electronic control unit as second data received from the first electronic control unit, based on the source information.

17. The storage device of claim 15, wherein the queue manager includes:

a command manager configured to transfer a second state of the first queue to the first electronic control unit and transfer the first state of the second queue to the second electronic control unit; and a queue priority manager configured to determine a first priority of the first command and a second priority of the second command, and transfer the first command and the second command to the controller according to the first priority and the second priority.

18. The storage device of claim 15, wherein the queue manager is configured to determine a first priority of the first command and a second priority of the second command based on whether the first data and second data corresponding to the second command is safety data, sensor data, or camera data.

19. The storage device of claim 15, wherein the queue manager is configured to determine a first priority of the first command and a second priority of the second command according to a first type of the first electronic control unit and a second type of the second electronic control unit.

20. The storage device of claim 15, wherein, in response to the second queue being in a near maximum capacity state and the second command being a write command, the queue manager is configured to process a read command stored in the second queue in a fail state and receive the remaining first data, not received, among the first data in response to the second command.

* * * * *